United States Patent
King et al.

(10) Patent No.: US 10,289,713 B2
(45) Date of Patent: May 14, 2019

(54) LOGICAL VALIDATION FOR METADATA BUILDER

(71) Applicant: CA, Inc., Islandia, NY (US)

(72) Inventors: David Patrick King, Prague (CZ); James Michael Newman, Plano, TX (US)

(73) Assignee: CA, Inc., Islandia, NY (US)

( * ) Notice: Subject to any disclaimer, the term of this patent is extended or adjusted under 35 U.S.C. 154(b) by 826 days.

(21) Appl. No.: 14/223,376

(22) Filed: Mar. 24, 2014

(65) Prior Publication Data

US 2015/0269218 A1    Sep. 24, 2015

(51) Int. Cl.
    *G06F 17/30*    (2006.01)

(52) U.S. Cl.
    CPC .............................. *G06F 17/30371* (2013.01)

(58) Field of Classification Search
    CPC ......... G06F 17/30371; G06F 17/30292; G06F 17/30607
    See application file for complete search history.

(56) References Cited

U.S. PATENT DOCUMENTS

| | | | |
|---|---|---|---|
| 6,714,979 B1 | 3/2004 | Brandt et al. | |
| 7,533,077 B2 | 5/2009 | Wang | |
| 8,793,223 B1 | 7/2014 | Cho et al. | |
| 2002/0049738 A1 | 4/2002 | Epstein | |
| 2003/0061209 A1 | 3/2003 | Raboczi et al. | |
| 2004/0064825 A1 | 4/2004 | Lim et al. | |
| 2005/0257210 A1 | 11/2005 | Stienhans et al. | |
| 2006/0248123 A1 | 11/2006 | Butash | |
| 2007/0156726 A1 | 7/2007 | Levy | |
| 2008/0195651 A1* | 8/2008 | Rachmiel | G06F 21/604 |
| 2008/0270992 A1 | 10/2008 | Geogieva | |
| 2009/0083295 A1 | 3/2009 | Minamino et al. | |
| 2009/0319365 A1 | 12/2009 | Waggoner et al. | |
| 2010/0180195 A1 | 7/2010 | Behrens | |
| 2011/0179110 A1 | 7/2011 | Soloway | |
| 2011/0307520 A1* | 12/2011 | Trofin | G06F 9/4443 707/792 |
| 2012/0089610 A1 | 4/2012 | Agrawal et al. | |
| 2013/0185657 A1 | 7/2013 | Gunawardena et al. | |
| 2013/0212116 A1 | 8/2013 | Filliettaz, III | |
| 2013/0304713 A1* | 11/2013 | Roy-Faderman | G06F 17/30371 707/702 |

(Continued)

OTHER PUBLICATIONS

JAXB and Marshal/Unmarshal Schema Validation written by Blaise Doughan, Dec. 20, 2010, at http://blog.bdoughan.com/2010/12/jaxb-and-marshalunmarshal-schema.html.

(Continued)

*Primary Examiner* — Robert W Beausoliel, Jr.
*Assistant Examiner* — Susan F Rayyan
(74) *Attorney, Agent, or Firm* — Sage Patent Group

(57) ABSTRACT

Metadata objects in metadata for a computer program are logically validated to confirm that content of the metadata has referential integrity. The metadata objects may also be logically validated according to specific validation rules that apply to the type of the metadata object. Recursive or non-recursive techniques may be used, depending upon the size of the metadata. Related systems, methods and computer programs are described.

18 Claims, 11 Drawing Sheets

(56) References Cited

U.S. PATENT DOCUMENTS

2014/0046906 A1* 2/2014 Patiejunas ......... G06F 17/30371
707/661
2014/0046909 A1* 2/2014 Patiejunas ......... G06F 17/30289
707/687
2015/0149876 A1 5/2015 Davis et al.

OTHER PUBLICATIONS

ArcGIS, "About validating metadata", downloaded Feb. 4, 2014 from http://help.arcgis.com/en/arcgisdesktop/10.0/help/index.html, 2 pp.
ArcGIS, "Validate Metadata (Conversion)", downloaded Feb. 4, 2014 from http://help.arcpis.com/en%20/arcgisdesktop/10.0/help/index.html, 3 pp.
ArcGIS, "Validating metadata" downloaded Feb. 4, 2014 from http://help.arcgis.com/en/arcgisdesktop/10.0/help/index.html, 3 pp.
CA Technologies, "CA Chorus™ Software Manager", downloaded Oct. 29, 2013 from http://www.ca.com/us/products/detail/ca-mainframe-software-manager.aspx, 5 pp.
CA Technologies, Product Brief—"CA Chorus™ Software Manager Release 5.1", copyright 2013, 10 pp.
Wikipedia, the free encyclopedia, "Marshalling", downloaded Feb. 4, 2014 from http://en.wikipedia.orp/w/index.php?title=Marshalling_(computer_science)&printable=yes, 2 pp.
Wikipedia, the free encyclopedia, "Metadata", downloaded Jan. 29, 2014 from http://en.wikipedia.org/w/index.php?title=Metadata&printable=yes, 12 pp.

* cited by examiner

LOGICAL VALIDATION FOR METADATA BUILDER

BACKGROUND

Various embodiments described herein relate to computer systems, methods and programs, and more particularly to systems, methods and computer programs that provide metadata for a computer program.

Metadata is "data about data". In the context a computer program, metadata may be used to describe the content of the computer program using a given metadata standard.

Metadata itself is data that can be stored and managed in a database, often called a "metadata registry" or "metadata repository". Metadata is generally structured according to a standardized context using a well defined metadata schema. The metadata schema may contain the rules created to structure the fields or elements of metadata. The metadata schema may be expressed in a mark-up or programming language, such as Extensible Markup Language (XML). Metadata schema can be hierarchical in nature, where relationships exist between metadata elements, and elements are nested so that parent-child relationships exist between the elements. Thus, metadata may be expressed in a hierarchical object-oriented structure.

As the complexity of computer programs increase, the complexity of the metadata thereof may also increase. For example, an enterprise computer program, also referred to as a mainframe computer program, may contain hundreds of thousands of lines of associated metadata. A specific example will now be provided relative to mainframe computer programs marketed by CA, Inc. ("CA"), the assignee of the present application.

Specifically, CA mainframe computer programs generally require metadata that CA Mainframe Software Manager (CA MSM), now known as CA Chorus™ Software Manager (CA CSM), uses to configure the program after installation and deployment. The metadata is written in XML using an XML editor. The metadata must be error-free, complete, and must conform to a metadata schema that is specified by CA CSM Software Configuration Service (SCS).

Unfortunately, a mainframe computer program may include on the order of 150,000 lines of XML metadata. It is, therefore, difficult and time consuming to design metadata that is error-free and complete using an XML editor.

BRIEF SUMMARY

Various embodiments described herein can logically validate metadata objects in metadata for a computer program to confirm that content of the metadata has referential integrity. In other embodiments, a respective one of the metadata objects in the metadata for the computer program is logically validated according to specific validation rules that apply to the respective one of the metadata objects.

In some embodiments, the metadata objects in the metadata of the computer program is logically validated according to a first technique, in response to a size of the metadata being greater than a threshold. Moreover, the metadata objects in metadata of the computer program may be logically validated according to a second technique that is different from the first technique, in response to the size of the metadata being less than the threshold. In some embodiments, the first technique comprises converting the metadata objects into a string, and the second technique comprises recursively processing the metadata objects to confirm that the metadata objects have referential integrity.

Moreover, in some embodiments the first technique may further comprise creating a document comprising a plurality of nodes from the string, retrieving from the document the nodes that comprise an ID reference, and confirming that the nodes that comprise an ID reference have referential integrity.

Furthermore, in some embodiments, the recursive processing may comprise executing respective methods of a given object to retrieve respective child objects, and retrieving a primary key of the respective child object and the given object to determine if the given object and the child object have the same primary keys. In other embodiments, the recursive processing may further comprise setting the respective child object as the given object and performing the executing and the retrieving if the primary keys are not the same, and flagging a referential integrity error for the given object if the given object and the respective child object do not have a same parent object. Object reflection may be used to execute respective methods of the given object to retrieve respective child objects.

In still other embodiments, logically validating a respective one of the metadata objects in the metadata for the computer program according to specific validation rules that apply to the respective one of the metadata objects may comprise logically validating the respective one of the metadata objects in the metadata for the computer program according to specific validation rules that apply to changing (i.e., creating or updating) the respective one of the metadata objects, in response to an instruction to update or change the respective one of the metadata objects, and logically validating the respective one of the metadata objects in the metadata for the computer program according to specific validation rules that apply to deleting the respective one of the metadata objects, in response to an instruction to delete the respective one of the metadata objects.

It will be understood that various embodiments have been described above in connection with methods of operating a computer system. However, various other embodiments described herein can provide analogous computer systems and computer programs.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Various embodiments described herein can provide a MetaData Builder (MDB) that allows metadata to be built by the way of two-way user interaction, that can generate metadata that is complete and error-free. As was noted above, a mainframe computer program may include on the order of 150,000 lines of XML metadata. It may be difficult to provide complete and error-free XML data of this magnitude using an XML editor.

Various embodiments will be described herein in connection with specific CA mainframe computer programs. However, various embodiments described herein may be used with mainframe computer programs that are distributed by other organizations and/or for other computer programs, such as enterprise, application, personal, pervasive and/or embedded computer programs.

Figure 1:
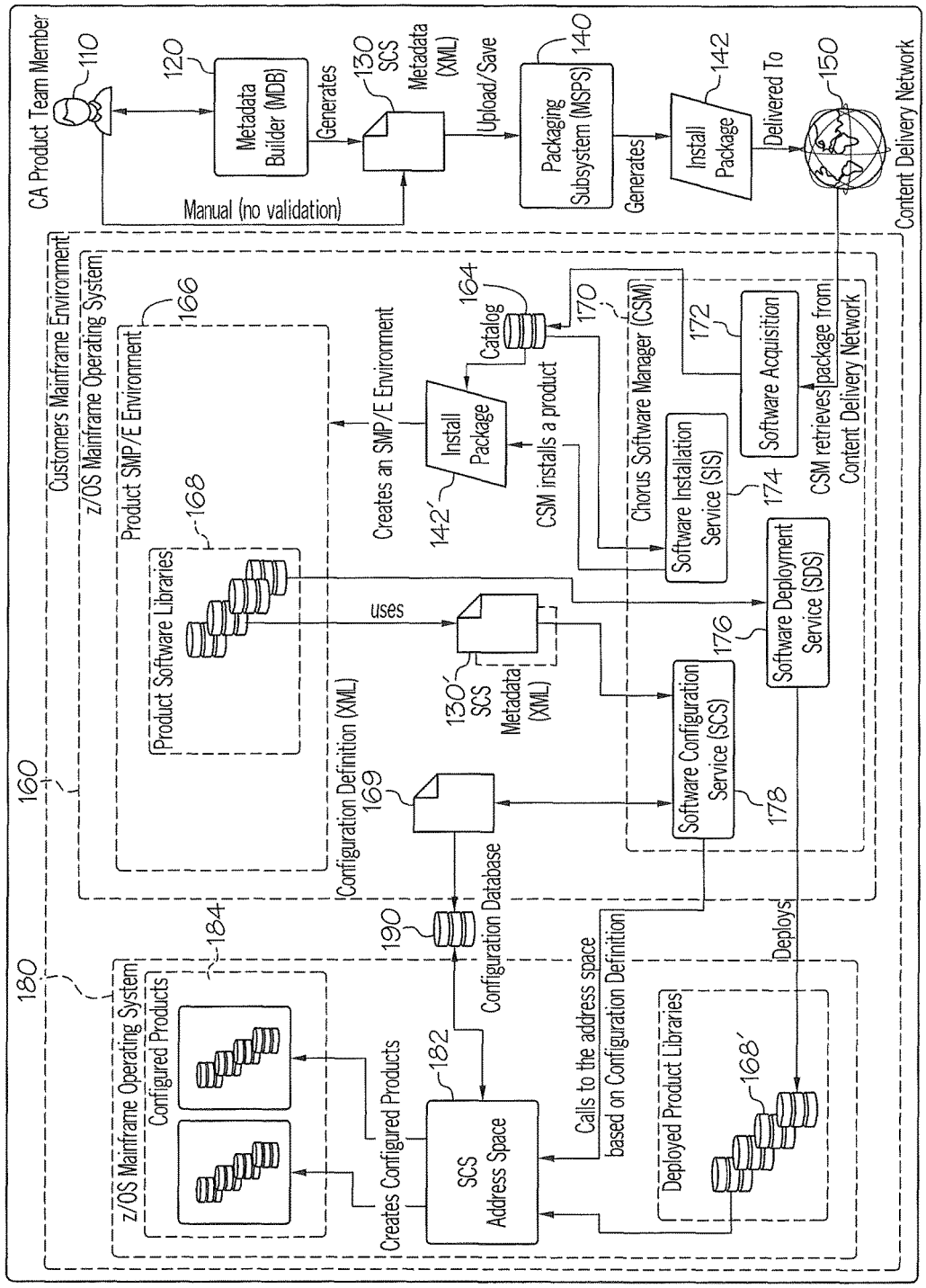
FIG. 1 is a block diagram of a computer program development and use environment according to various embodiments described herein.

FIG. 1 is a block diagram of a computer program (also referred to herein as "a computer program product" or simply as "a product") development and use environment according to various embodiments described herein.

Referring to FIG. 1, a metadata developer, such as a CA Product Team Member 110 at a user terminal, interacts with a MetaData Builder (MDB) 120 according to various embodiments described herein, to produce XML Software Configuration Services (SCS) metadata 130. The SCS metadata 130 is then packaged with a CA product by a packaging subsystem 140, and the resulting install package 142 is distributed to the customer using a content delivery network, such as the CA Content Delivery Network 150.

In the customer's mainframe environment 160, Chorus Software Manager (CSM) 170 uses its Software Acquisition component 172 to retrieve the install package 142 from the Content Delivery Network 150. The install package 142' is then stored as information in a Catalog database 164. The CSM 170 Software Installation Service (SIS) 174 uses a product's associated Install Package 142' located in the Catalog database 164 to create an SMP/E Environment 166. Each SMP/E Environment 166 contains a set of software libraries 168 associated with the installed product. The CSM 170 Software Deployment Service (SDS) 176 transmits a copy of the Product Software Libraries 168' to the mainframe system where the deployed product is to be configured 180.

The SCS metadata 130' which was created by the MDB 120 and is included within one or more of the installed Product Software Libraries 168 is used by the Chorus Software Manager (CSM) 170 Software Configuration Services (SCS) 178 to create a Configuration Definition 169. A Configuration database 190 is updated with the resulting Configuration Definition 169.

The CSM 170 SCS 178 interacts with the SCS Address Space 182 running on a z/OS Mainframe 180 where the deployed Product Libraries 168' are accessed to create a configured instance of the product 184. SCS 178 interacts with the SCS Address Space 182 to orchestrate the implementation of a set of configuration operations defined in the constructed Configuration Definition 169. Each SCS Configured Product 184 is constructed using its associated SCS Metadata 130 that was created and generated by the MDB 120.

It will be understood that any of the blocks of FIG. 1 including the MDB 120, packaging subsystem 140, content delivery network 150 and the customer's mainframe environment 160, and/or any combination or subcombination of the blocks of FIG. 1, may be embodied as one or more enterprise, application, personal, pervasive and/or embedded computer systems that are operable to receive, transmit, process and store data using any suitable combination of software, firmware and/or hardware and that may be stand-alone or interconnected by any conventional, public and/or private, real and/or virtual, wired and/or wireless network including all or a portion of the global communication network known as the Internet, and may include various types of tangible, non-transitory computer readable media.

Figure 2:
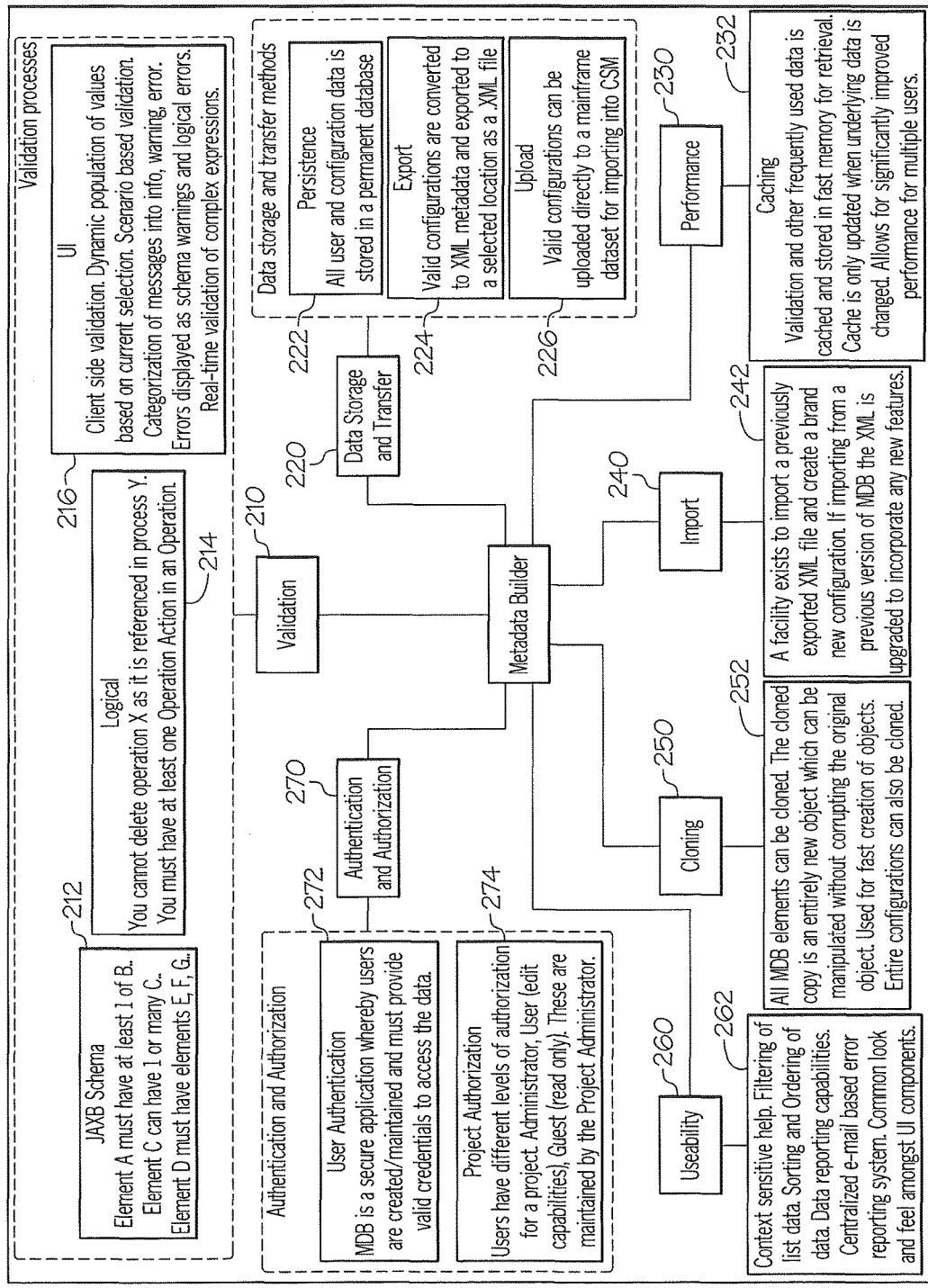
FIG. 2 is a block diagram of a metadata builder according to various embodiments described herein.

FIG. 2 is a block diagram of a metadata builder according to various embodiments described herein, which may correspond to the MDB 120 of FIG. 1. The MDB 120 includes a validation system 210, a data storage and transfer system 220, a performance system 230, an importing system 240, a cloning system 250, a usability system 260 and an authentication and authorization system 270.

The authentication and authorization system 270 provides user authentication (Block 272) and also allows different levels of authorization for the project (Block 274), so that, for example, one user may have write access, while other users may have read access. The validation system 210 provides schema validation 212, logical validation 214 and a User Interface (UI) 216 that provides interactive metadata creation. The data storage and transfer system 220 allows persistent storage of configuration data as it is created (Block 222), allows exporting of valid configurations (Block 224) and uploading of the valid configuration to CSM (Block 226). The performance system 230 provides caching (Block 232) of validated and frequently used data to allow improved performance with multiple users. The importing system 240 provides a facility to import a previously exported XML metadata set and create a new configuration (Block 242). The cloning system 250 allows new data objects to be cloned from existing data objects (Block 252). Finally, the usability function 260 provides context-sensitive help and other usability functions (Block 262).

The information pertaining to a CA product which can be deployed on a mainframe by CA Chorus™ Software Manager (CSM) is contained in metadata in XML format. This metadata is constructed by means of a user interface application called CA Chorus™ Software Manager SCS MetaData Builder (MDB). The metadata can also be constructed externally to MDB. In the MDB application, the metadata is stored in data objects known as "configurations". The creation of a configuration is an iterative process through which the user is guided by various validation and messaging techniques. When a configuration is complete (contains no errors) it can be exported to an external file for storage on a file system or uploaded directly to a mainframe for storage within a data set.

Various embodiments of schema validation 212 are described in application Ser. No. 14/223,440, entitled "Schema Validation for Metadata Builder", filed concurrently herewith, the disclosure of which is hereby incorporated by reference in its entirety as if set forth fully herein. Various embodiments of importing 240 are described in application Ser. No. 14/223,260, entitled "Importing Metadata Into Metadata Builder", filed concurrently herewith, the disclosure of which is hereby incorporated by reference in its entirety as if set forth fully herein. Various embodiments of logical validation 214 are described in the present application. Finally, various embodiments of a user interface 216 are described in application Ser. No. 14/223,307, entitled "Interactive User Interface for Metadata Builder", filed concurrently herewith, the disclosure of which is hereby incorporated by reference in its entirety as if set forth fully herein.

Logical Validation—High Level Description

The present embodiments provide a logical validation function, such as the logical validation function 214 of FIG. 2, for a metadata builder, such as MDB 120 of FIG. 2. Logical validation 214 is used to check for referential integrity of the metadata. For example, the metadata may conform to schema validation rules, but while syntactically correct, the output might not function as expected when deployed to a mainframe. The logical validation 214 ensures that the content of the data, and not just the structure, is correct. Java rules may be used to ensure that referential integrity and data values are valid and will not cause problems upon deployment. Thus, the logical validation 214 may generate a warning, such as "You cannot delete operation X as it is referenced in process Y" or "Resource type X cannot have Symbol Table references". The logical validation may be adaptive, based on the particular content of the metadata. As the metadata content is examined, specific logical validation rules are applied.

For CA mainframe products that are configurable using CA Chorus Software Manager (formerly known as CA Mainframe Software Manager), functionality did not previously exist to easily and intuitively create metadata. In addition to providing validation information directly related to the content of the metadata, various embodiments described herein can also provide the user with information about the relationship between the metadata objects and how to fix any errors which are outstanding. This information is relayed to the user via a UI, such as UI 216.

Accordingly, various embodiments described herein can save the user time by displaying any outstanding issues with their metadata and providing detailed information about where and why these issues are present. Various embodiments described herein can examine the internal components of a user's metadata and examine the relationships between these metadata objects. Internal rules are applied to the objects and any errors or potential errors are reported. The information relayed back to the user can be easy to understand. In contrast, in a manual process, such as using an XML editor, only the structure of the metadata can be examined for correctness.

Figure 3:
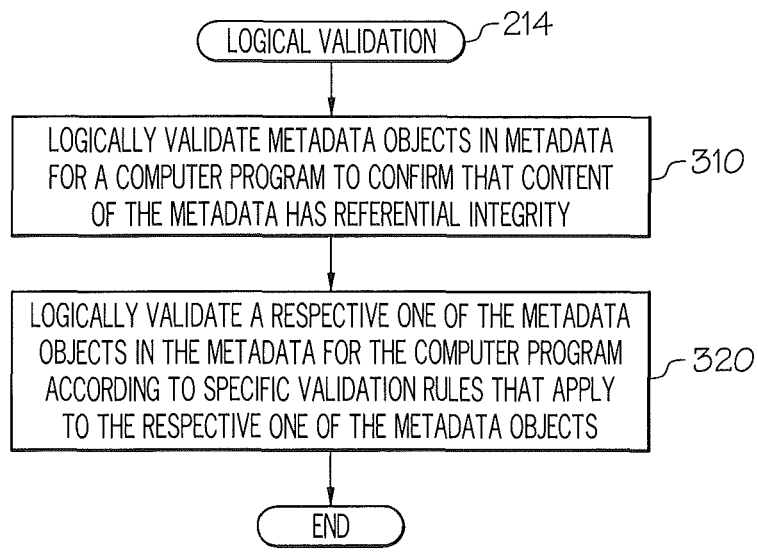
FIGS. 3-10, 11A-11B and 12 are flowcharts of operations that may be performed for logical validation according to various embodiments described herein.

FIG. 3 is a flowchart of operations that may be performed for logical validation according to various embodiments described herein. These operations may be performed by a metadata logical validation function, such as the logical validation function 214 of FIG. 2.

Referring to FIG. 3, at Block 310, metadata objects in metadata for a computer program are logically validated to confirm that content of the metadata has referential integrity. Thus, although the metadata may conform to schema validation rules, Block 310 validates the content of the data to ensure that the content of the data, and not just the structure, is correct. As used herein "referential integrity" is a property of data which, when satisfied, requires every value of one attribute of a relation to exist as a value of another attribute in a different or the same relation. Thus, for example, for referential integrity to hold in the metadata builder application, ID references are used to infer the relationships. Any object which is referenced in an another object by the use of an ID reference cannot be deleted as long as one or more references to the object exists elsewhere in the configuration object hierarchy. Moreover, in some cases, the original object cannot be altered if there are any references to this object as the data content is dependent on the original object state.

Still referring to FIG. 3, at Block 320, additional embodiments described herein can logically validate a respective one of the metadata objects in the metadata for the computer program according to specific validation rules that apply to the respective one of the metadata objects. Various examples will be provided below.

Figure 4:
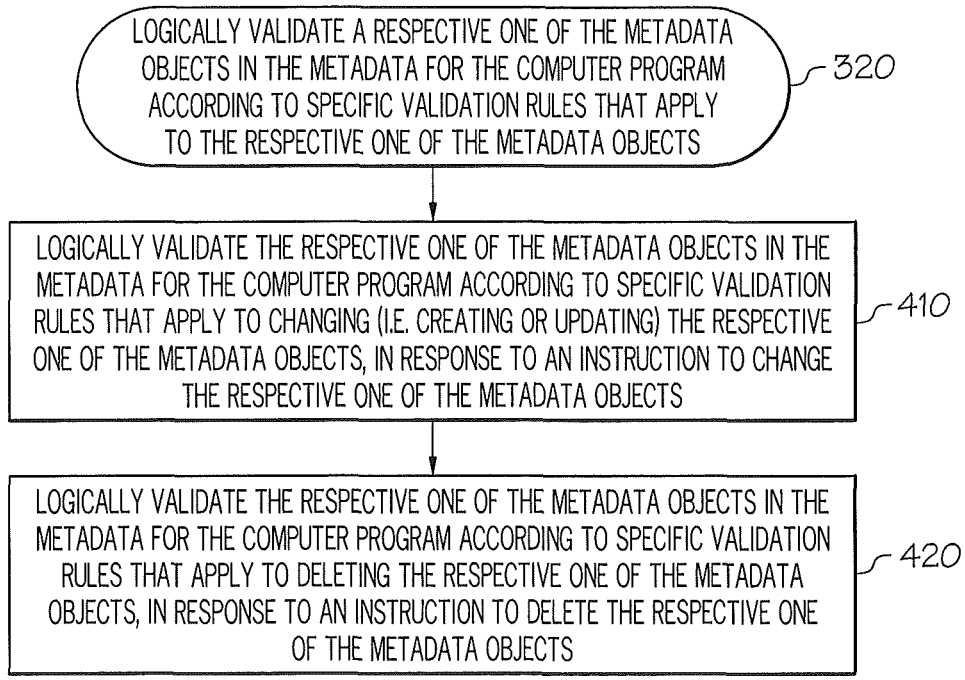

FIG. 4 is a flowchart of operations that may be performed to logically validate a respective one of the metadata objects in the metadata for the computer program according to specific validation rules that apply to the respective one of the metadata objects, which may correspond to Block 320 of FIG. 3. Referring to FIG. 4, at Block 410, the respective one of the metadata objects in the metadata for the computer program is logically validated according to specific validation rules that apply to changing (i.e., creating or updating) a respective one of the metadata objects, in response to an instruction to change the respective one of the metadata objects. Moreover, at Block 420, the respective one of the metadata objects in the metadata for the computer program is logically validated according to specific validation rules that apply to deleting the respective one of the metadata objects, in response to an instruction to delete the respective one of the metadata objects. Various examples will be provided below in connection with FIG. 8.

Figure 5:
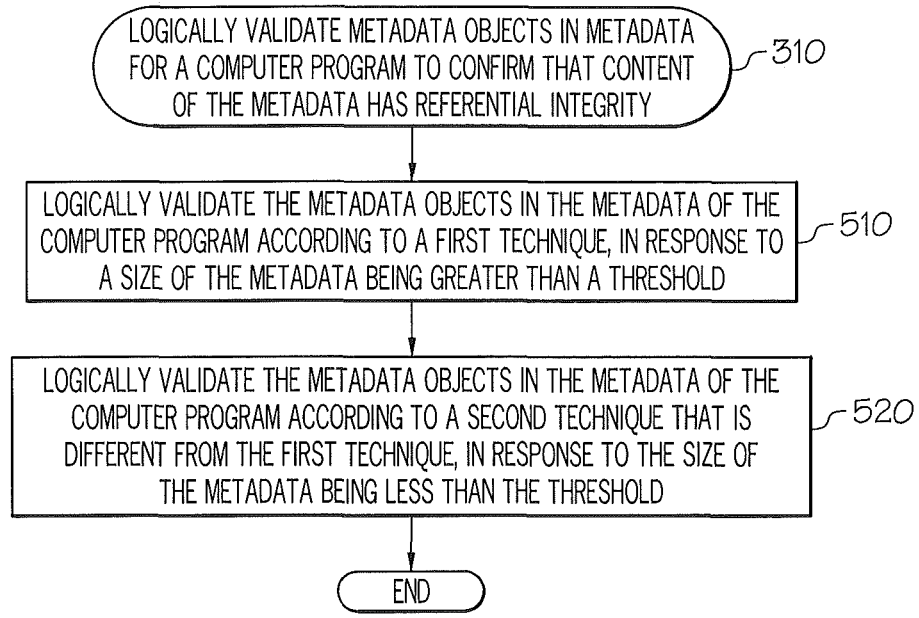

FIG. 5 is a flowchart of other operations that may be performed to logically validate metadata objects in metadata for a computer program to confirm that content of the metadata has referential integrity, which may correspond to Block 310 of FIG. 3. Referring to FIG. 5, at Block 510, the metadata objects in the metadata of the computer program are logically validated according to a first technique, which may, for example, use non-recursive processing, in response to a size of the metadata being greater than the threshold. The threshold may be fixed or variable, and may be expressed as an absolute size of the metadata, a percentage size of the metadata relative to the largest metadata that can be processed and/or other techniques for defining a large size of metadata compared to a small size of metadata. More detailed embodiments of non-recursive processing will be described below in connection with FIG. 6.

At Block 520, the metadata objects in the metadata of the computer system are also logically validated according to a second technique that is different from the first technique, and which may involve recursive processing, in response to the size of the metadata being less than the threshold. More detailed embodiments of FIG. 5 will be described below in connection with FIGS. 7 and 9.

Figure 6:
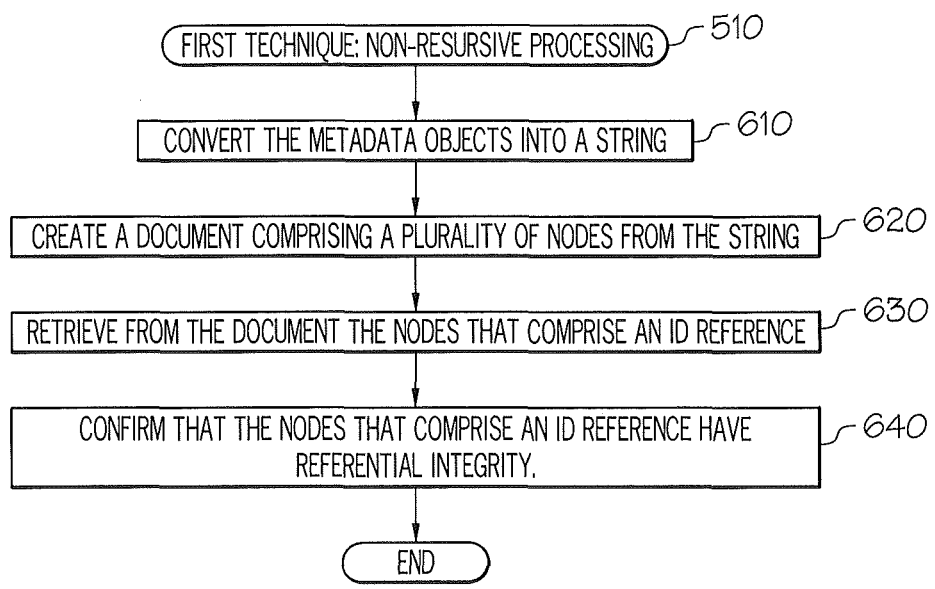

FIG. 6 is a flowchart of embodiments of the first technique, using non-recursive processing, which may correspond to Block 510 of FIG. 5. Referring to FIG. 6, at Block 610, metadata objects are converted into a string, for example by marshalling. As used herein "marshalling" means an operation, such as provided by a Java™ programming language, to convert a Java object into an XML object. Moreover, as used herein, the term "unmarshalling" means an operation, such as may be provided by a Java programming language, to convert an XML string into a Java object structure.

Continuing with the description of FIG. 6, at Block 620, a document comprising a plurality of nodes is created from the string. As used herein, a document refers to a text file that is annotated using XML tags to provide linearization of a tree structure. Moreover, a node of a document refers to a node of the tree structure that is linearized in an XML document.

At Block 630, nodes that comprise an ID reference are retrieved from the document. As used herein, the term "ID reference" means a string identifier which allows the value of one XML element to be an element elsewhere in the metadata provided that the value of the ID reference is the ID value of the referenced element. The ID represents a unique ID name for the attribute that identifies the element within the context of the metadata. An ID reference may also be referred to herein as a "reference ID" or simply as an "ID".

Finally, at Block 640, a confirmation is made that the nodes that comprise an ID reference have referential integrity. More detailed embodiments of FIG. 6 will be provided below in connection with FIG. 10.

Figure 7:
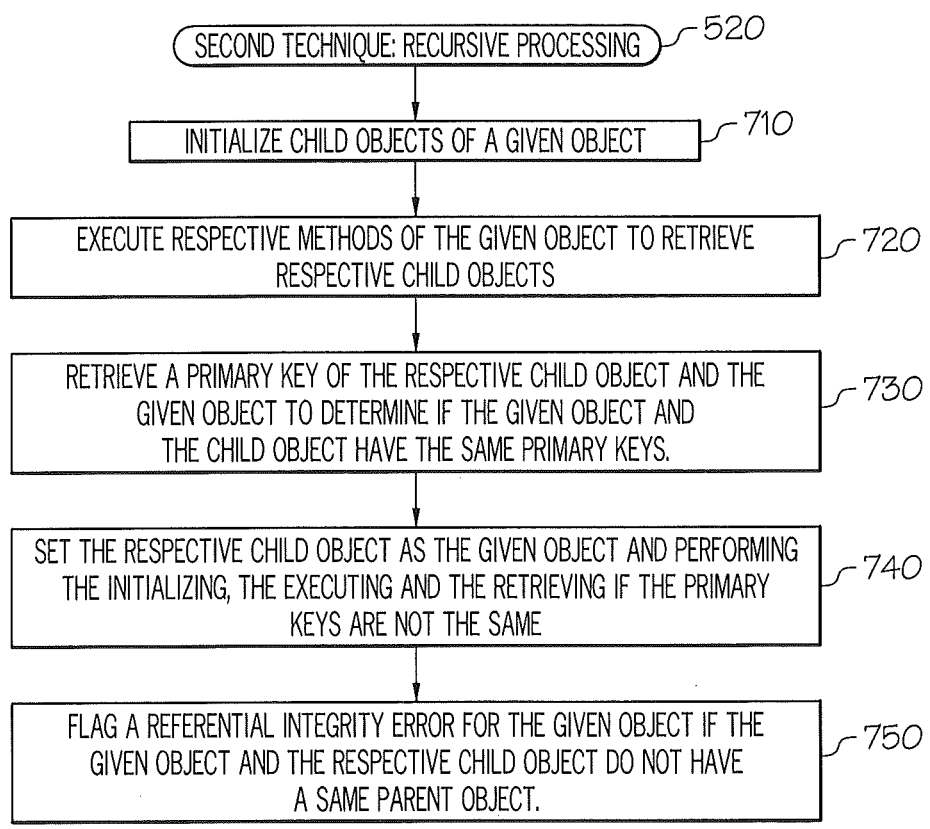

FIG. 7 is a flowchart of operations that may be performed using the second technique that may comprise recursive processing, which may correspond to Block 520 of FIG. 5. Referring to FIG. 7, at Block 710, child objects of a given object are initialized, if necessary. At Block 720, respective methods of the given object are executed to retrieve respective child objects. Operations of Block 720 may be performed using object reflection. As used herein object "reflection" is a computer operation that allows inspection of classes, interfaces, fields and methods at runtime, without knowing the names of the interfaces, fields and/or methods at compile time. It also allows instantiation of new objects and invocation of methods. Reflection can also be used to adapt a given program to given situations dynamically.

Still referring to FIG. 7, at Block 730, a primary key of the respective child object and the given object is retrieved, to determine if the respective object and the child object have the same primary keys. At Block 740, the respective child object is set as the given object, and the initializing, executing and retrieving of Blocks 710, 720 and 730 are again performed, if the primary keys are not the same. In contrast, at Block 740, a referential integrity error is flagged for the given object, if the given object and the respective child object do not have a same parent object. More detailed embodiments of FIG. 7 will be provided below in connection with FIG. 11.

Logical Validation—Intermediate Level Description

Figure 8:
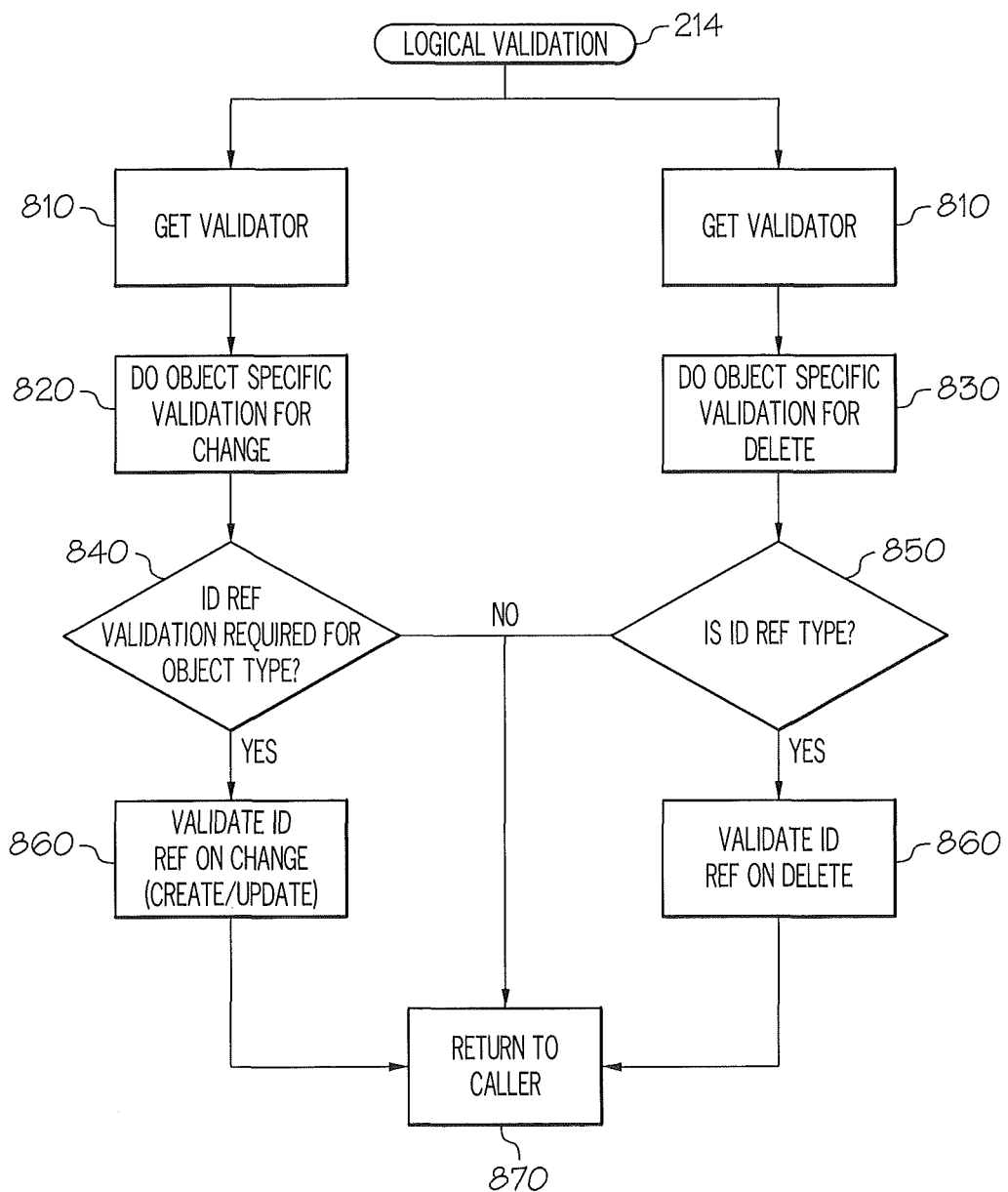

FIG. 8 is a flowchart of operations that may be performed for logical validation 214 according to other embodiments described herein. These embodiments of logical variation may also be referred to as "CRUD" validation. CRUD is an acronym for the four basic functions of persistent storage: Create, Read, Update and Delete. In MDB, when the user selects a Save or Delete button, this executes a CRUD command to the backend service. Each service in turn makes a call to a generic validation service, passing the object which has been selected for the CRUD operation. At Block 810, each object may have a set of specific validation rules which must be checked and verified against before the operation is allowed to continue. These rules may be used to check referential integrity of data content based on the type of operation. These rules will be explained by giving specific examples below. The Java object or validator which executes the validation rules is instantiated here. A validator is not a required object.

If the operation is a create or update operation, i.e., a "change" operation, then the type of operation is passed to the specific validator and the create or update rules are applied at Block 820. Not all objects require ID reference validation when a create or update operation is executed. A check is, therefore, made at Block 840 here to see if it is required. If it is not required, then the results of any specific validation are returned to the calling service at Block 870. In contrast, if the candidate object does require ID reference checking at Block 840, the candidate object, its parent object and the create or update operation type is passed to a routine at Block 860, to check if this object is referenced elsewhere in the configuration.

Returning to Block 214, if the operation is a delete operation, then the type of operation is passed to the specific validator at Block 810 and the delete rules are applied at Block 830. At Block 850, if the candidate object is not an ID Reference type object, then the results of any specific validation are returned to the calling service at Block 870. If it is an ID Reference object, then this object is checked for references elsewhere in the configuration at Block 860. The processing is the same as in Block 860 of the create/update branch, except that the delete operation is passed as a parameter.

A general discussion of validating an ID reference (Block 860) will now be provided. More specific embodiments will be described in connection with FIG. 9.

In general, if an object is an ID reference type, then it may be referenced elsewhere in the configuration. The places of reference for all objects to all other objects will create a reference matrix which may be too complicated to allow static checking rules to be applied. The configuration also makes heavy use of free-format text fields. Thus, if using an ID Reference as a string value, a simple text search may find occurrences of the ID Reference value in descriptive fields which would cause false errors to be reported. As such, the type of data element which holds a reference must also be considered when determining if the occurrence of the string value is a valid ID reference.

Configurations may be very large objects with thousands or more of nodes in the hierarchical tree to process. Thus, a test may be performed by checking the size of the object. Based on this size, the type of algorithm used to check for the ID references may change from configuration to configuration. Without such size-based processing, the validation process can be very time consuming and may lead to timeout issues in the UI. Thus, two different techniques may be used in response to the size of the metadata, as was described in FIG. 5. The first technique, used for large metadata (Block 510) may use non-recursive processing (FIG. 6). The second technique, for smaller metadata (Block 520) may use recursive processing (FIG. 7).

Figure 9:
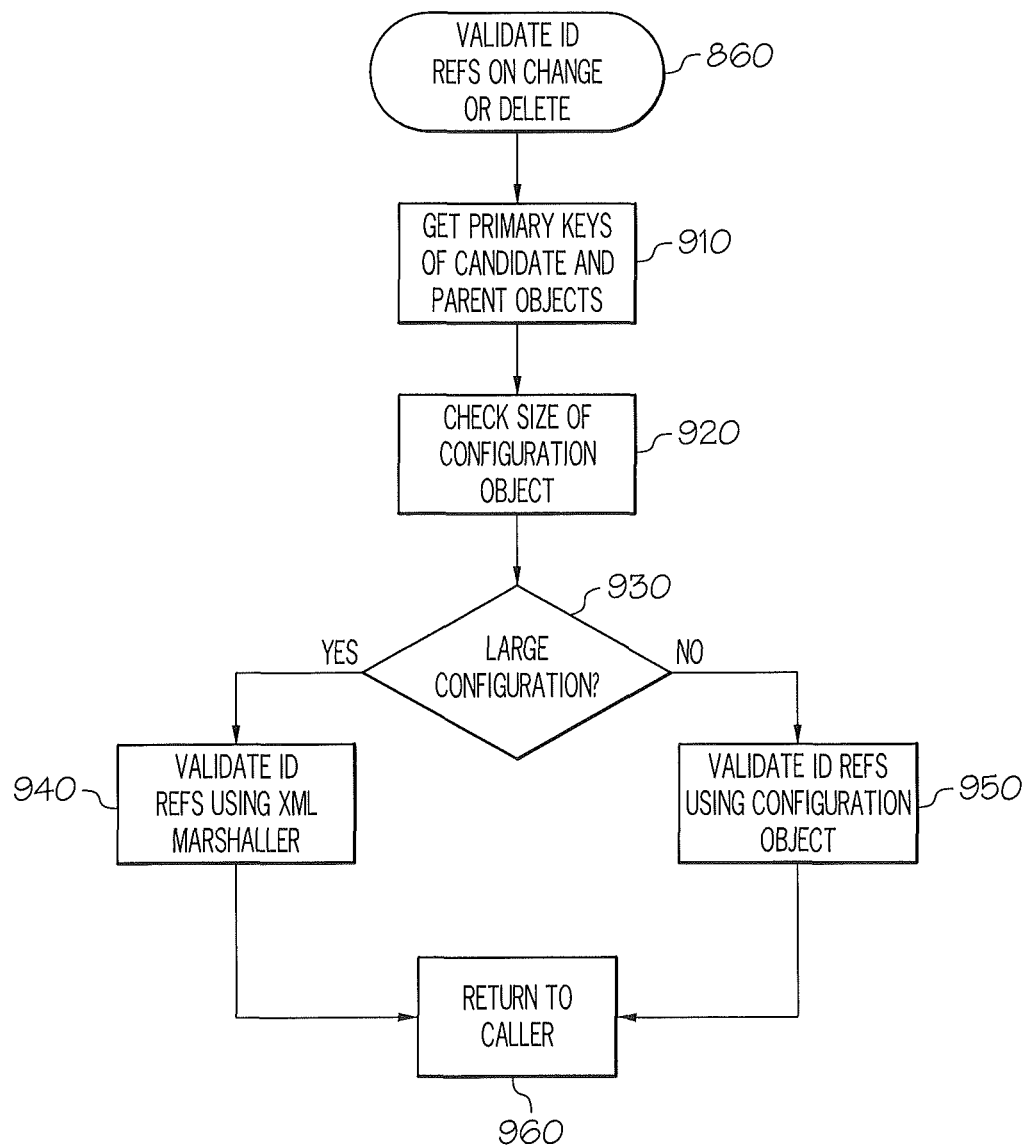

FIG. 9 is a flowchart of operations that may be used to validate ID references, which may correspond to Block 860 of FIG. 8 for both the "create/update" branch and the "delete" branch of FIG. 8.

Referring to FIG. 9, all objects are identified by a unique identifier which is the primary key in a database. To confirm if two objects are the same, the primary keys are used. The primary keys of the candidate object and the candidate's parent object may be retrieved using Java reflection. At Block 920, a specific threshold value is selected by a user preference in the UI, by automatically determining the largest configuration in the database during startup and/or using other techniques. The threshold may be fixed or may vary over time, per user, based on the processing resources available, based on the speed needed for the metadata build and/or based on other parameters. For example, based on the size of the largest possible configuration (in bytes), if the configuration that the candidate object belongs to exceeds a percentage of this value (the threshold), then check for ID references using one of two techniques.

Regardless of the way the threshold is determined, a test is made at Block 930, whether the configuration is considered to be large. If yes, then at Block 940, the configuration is validated using an XML marshalling technique. A more detailed embodiment will be provided in FIG. 10. On the other hand, at Block 930, if this configuration does not exceed the threshold, it can be processed efficiently using the configuration Java object at Block 950. A more detailed embodiment will be described in connection with FIG. 11. Accordingly, Block 940 provides a specific embodiment of the operations of Block 510 of FIG. 5 and Blocks 610-640 of FIG. 6; and Block 950 provides a more detailed embodiment of the operations of Block 520 of FIG. 5 and Blocks 710-750 of FIG. 7.

Logical Validation—Low Level Description

A low level description of logical validation according to various embodiments described herein will now be provided. This low level description will elaborate on Blocks 940 and 950 of FIG. 9.

Figure 10:
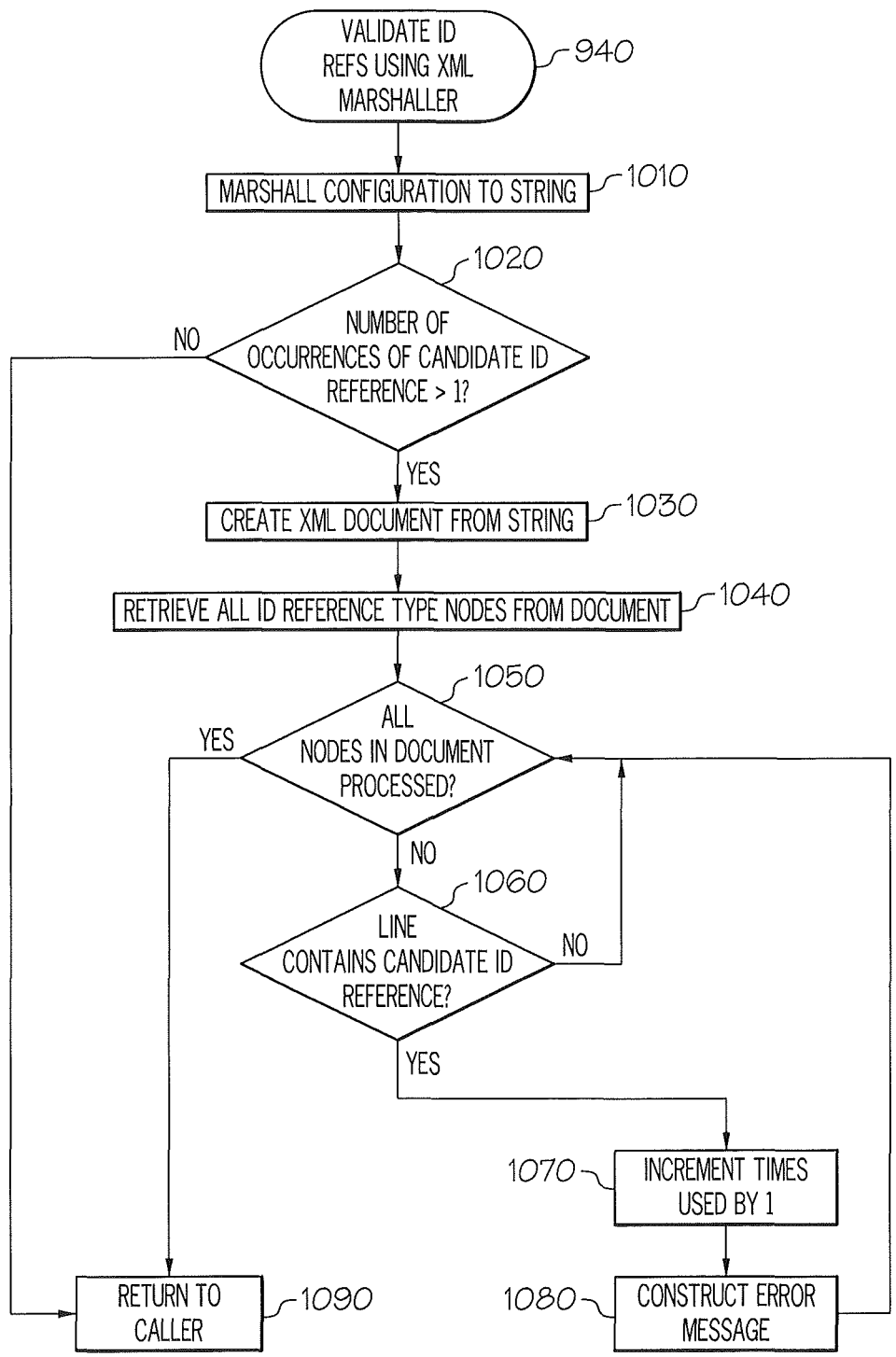

FIG. 10 is a flowchart of operations that may be performed to validate ID references using an XML marshaller, which may correspond to Block 940 of FIG. 9. Referring to FIG. 10, ID references are strings, but the context of where the string is determines whether it is an ID reference or only a piece of text. This negates the use of a simple text search on a marshalled configuration. Embodiments of FIG. 10 convert the marshalled configuration to an XML document and each node of the document is processed. The attributes of the node will be used to check if it is to be considered an ID Reference type data object.

Specifically, at Block 1010, using a JAXB marshaller, covert the configuration Java object to a string. At Block 1020, perform a single text search for the number of occurrences of the candidate ID reference in the string. If it is only one, then this object is not referenced anywhere else, so a more detailed search is not required, and operations return to the caller at Block 1090.

If there is more than one occurrence of the ID reference string value in the configuration at Block 1010, an in-depth search is performed. To do this efficiently, convert the string to an XML document at Block 1030, where each element of the configuration is a node. Each node has attributes which can be used to determine its type and then the value can be compared to the candidate reference.

Some preprocessing may be performed on the document by scanning all nodes and only selecting those which are of ID reference type (Block 1040). Only these types need be checked for value. The candidate object is ignored and not included in the pre-selected list. At Block 1050, process all the pre-selected ID reference nodes.

At Block 1060, a test is made whether this node contains a reference to the candidate ID reference. Line numbers are also included in the node information. These line numbers will be used for error message information so the user can easily locate the offending ID reference. If yes, then at Block 1070, the number of references is incremented by one. The candidate may be referenced numerous times, so each reference is reported to the user. Based on the location of the reference, a detailed message is constructed at Block 1080, informing the user where the error(s) has occurred.

Figure 11A:
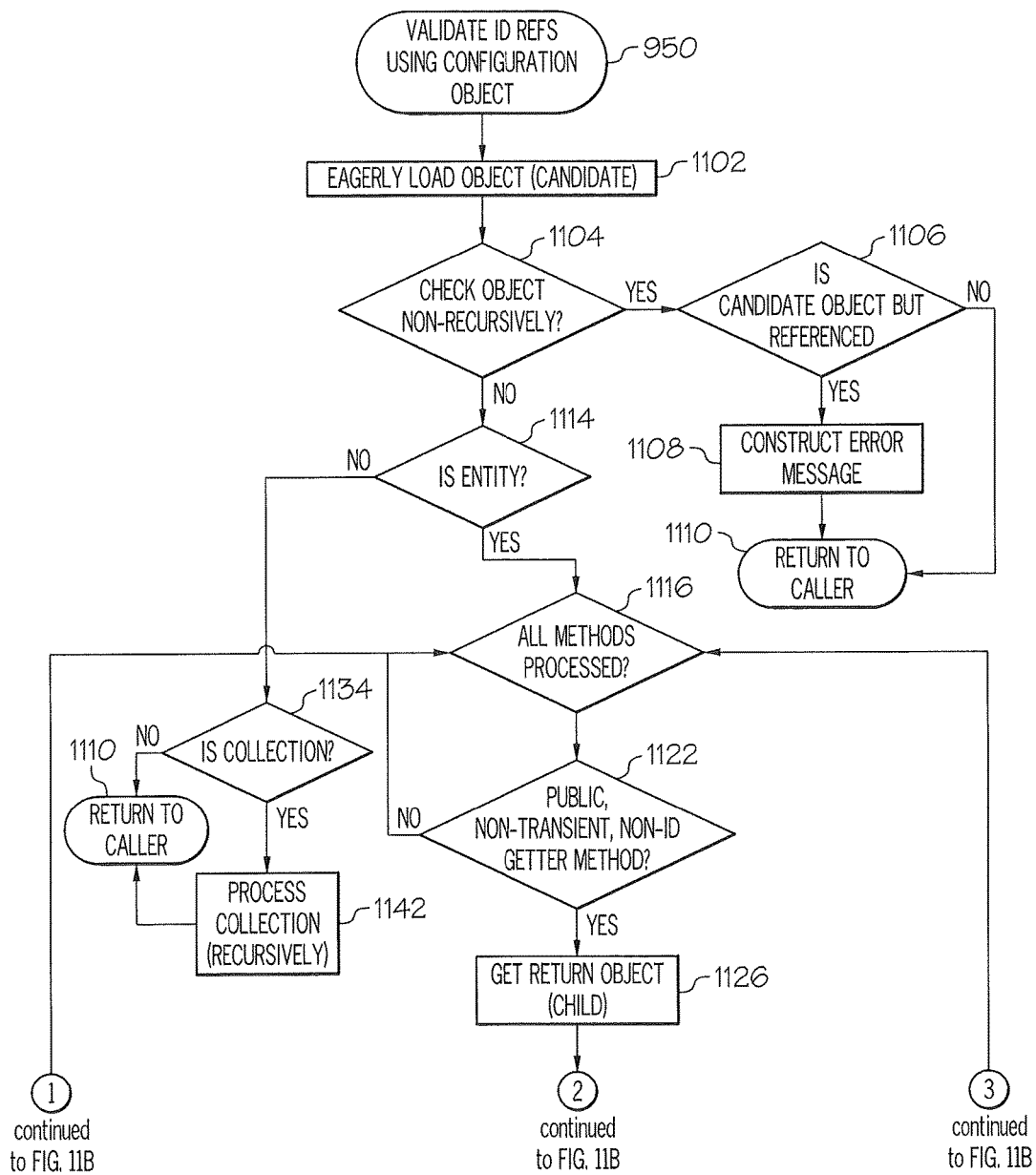
Figure 11B:
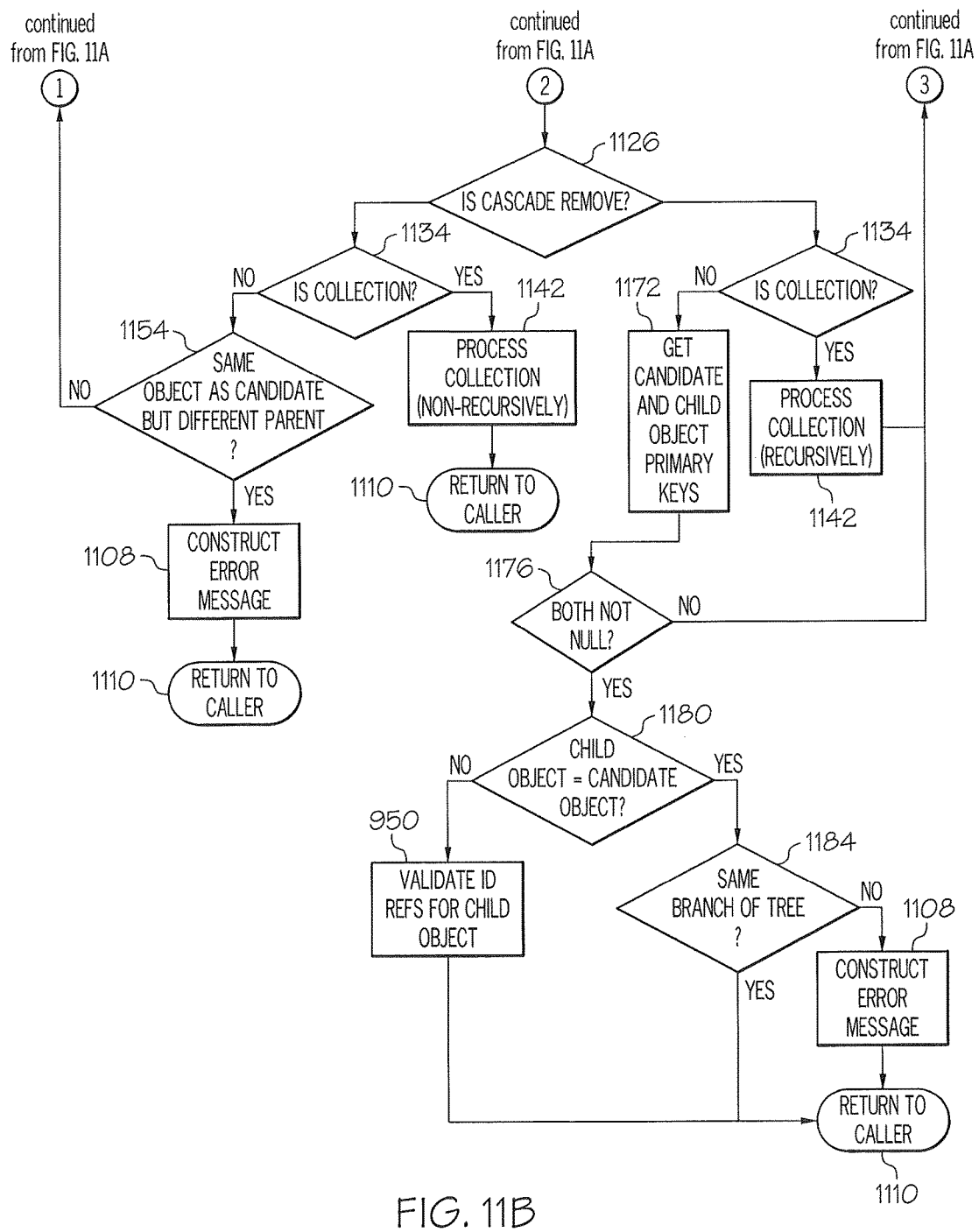

FIGS. 11A and 11B, which will be referred to collectively herein as FIG. 11, is a flowchart of operations that may be performed to validate ID references using a configuration object, which may correspond to Block 950 of FIG. 9. These operations may be performed for a relatively small configuration and, as such, may use a second technique, such as recursion, that was described generally at Block 520 of FIG. 5 and in FIG. 7.

Referring to FIG. 11, Objects in MDB may be "lazily loaded", meaning that any child elements are not initialized until they are needed. As this routine uses Java reflection, the method of initialization may not fully guarantee that the child element will be available when referenced. Thus, this object may be "eager loaded" at Block 1102, which is the process of manually initializing the object thus making all child elements available.

There exists a scenario where a collection (a list, map or set of multiple objects) must be validated, but only the elements of the collection itself and not any child objects of the collection element. Thus, a test is made at Block 1104. At Block 1106, a test is made as to whether the collection element is the same object as the given or candidate object (same ID), but the parent object is different. That would signify that it is a reference and not the original object itself. If yes, this is a reference, so construct an error message at Block 1108 containing details of the circumstances of the reference. Processing returns to the caller at Block 1110.

Returning to Block 1104, if the given object is to be checked recursively, then at Block 1114, a test is made as to whether the given object currently being examined is an entity type object. An entity type object is a persistable object that can be processed.

At Block 1114, if this given object is not an entity, a test is made at Block 1134 if it is a collection. If not, return to the calling method (Block 1110). On the other hand, if it is a collection, process it at Block 1142 recursively or non-recursively as determined by the caller at Block 1142.

Returning to Block 1114, if the given object is not an entity, then at Block 1116, using Java reflection, process all methods in the given object class. At Block 1122, a test is made whether the method is public, non-transient and is not an ID method. If yes, this means this method contains a valid child object, which may hold information about ID references. Thus, at Block 1124, using Java reflection, execute the method in question to retrieve the Child Object (CO).

At Block 1126, a test is made whether the method is annotated with Cascade.REMOVE, meaning that some deep investigation of the contents of the CO should be performed. At Block 1134, this is not Cascade.REMOVE and not a collection, but at Block 1154, a test is made whether the CO is the same as the given object (same IDs), but with different Parent Objects (PO). If so, an error message is constructed at Block 1108.

On the other hand, if it is Cascade.REMOVE and is not a collection, then at Block 1172, retrieve the primary keys of the given (candidate) and child objects. At Block 1176, a test is made whether both keys not null (meaning given and child objects exist). If yes, then at Block 1180, the CO and the given object are the same object. If not, then at Block 1182, set the CO as the given object and call this (self) method recursively processing the new given object and its child objects. On the other hand, if the CO and given object are the same at Block 1180, a test is made at Block 1184 whether they have the same parent object. If so, then they can be considered to be in the same part of the tree, so ignore it. If they do not have the same parent, then this is an ID reference of the given object. Prepare an error for this occurrence at Block 1108 and return to the calling method at Block 1110.

Accordingly, embodiments of FIG. 11 can traverse a parent-child object hierarchy until an object is found where no more drilling down is necessary. If the object is a candidate, then its parents are checked. If two parents have the same ID, then an original object was found. If not, then an error is produced. Processing occurs recursively until all of the objects have been processed.

Figure 12:
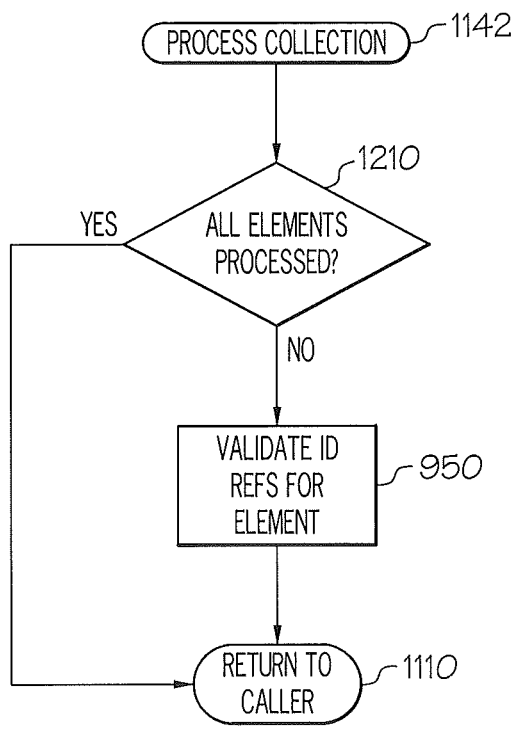

FIG. 12 is a flowchart of operations that may be performed to process a collection, which may correspond to Block 1142 of FIG. 11. Referring to FIG. 12, each element in the collection must be processed. It is up to the caller to determine if the element must be processed recursively or not. At Block 510, process all elements in the collection, returning to the caller when finished (Block 1110). If all elements have not been processed at Block 1210, then execute Block 950—validate ID references using the configuration object, using the current collection element object as the candidate object. Also pass the given recursive/non-recursive parameter to this method.

Specific examples of various object logical validation operations will be described, which may correspond to Blocks 820 and 830 of FIG. 8. The following examples shall be regarded as merely illustrative and shall not be construed as limiting the invention.

1. Specific Validation of a Resource Containing Tracking Data

Trackable resources are an integral component of SCS metadata. Specifically, CSM SCS processing supports the creation of one or more unique instances of a configured product. Each instance makes use of variable data to distinguish one instance from another. The variable data associated with a product is described by its SCS XML instance document(s), and is used by CSM to obtain the specific value of each variable from a CSM end user, from environment profiles located in the CSM System Registry, and from default values contained within the product's SCS XML document(s). CSM sees each instance of an SCS configured product as being a collection of "trackable" resources. The level of each "trackable" resource is known to, and is maintained by, CSM. At the time a product configuration is created, CSM assigns the configuration a unique configuration ID value. The configuration ID is used by CSM to associate the collection of "trackable" resources to that specific instance of the configured product. Using unique configuration ID values allows CSM to manage multiple configurations of the same product.

However, a resource tracking data is not identified like other MDB objects. Most other objects use ID references, but resource tracking data uses a free form string. It is for this reason that specific validation is performed on a resource that contains tracking data.

If the resource had tracking data but has been removed as part of the current operation, then all processes in the configuration are checked for an occurrence of the removed tracking data. If there are any occurrences, then an error is generated.

Resources may contain resource maintenance sensitive data objects. If the scope (an attribute of tracking data) of the resource being processed is DEPLOYMENT, then all maintenance sensitive lists are scanned for an occurrence of removed tracking data and an error generated if found.

Resource tracking IDs (RTIDs) must be unique. The current RTID is compared against all existing RTIDs. An error is generated if any other occurrence is found.

DEPLOYMENT scope resources must conform to certain rules. Exceptions to these rules will generate an error.

Resources with tracking data scope DEPLOYMENT is allowed only for data set resources.

Resources with tracking data scope DEPLOYMENT must have target level set to 0.

Resources with tracking data scope DEPLOYMENT must have tracking ID set to the name of resource.

Resources with tracking data scope DEPLOYMENT must not have a maintenance sensitive list.

The scope of a resource tracking data cannot be changed if the resource is already referenced in any other resources maintenance sensitive lists. All resources are scanned and an error generated if a reference is found.

A resource with scope DEPLOYMENT must not be reference by its RTID in any process.

A resource with scope DEPLOYMENT must not be reference in any processes process affected resource list.

2. Specific Validation of Environment Profiles

CSM maintains a System Registry which is made up of settings corresponding to one or more systems. Each system in the CSM System Registry is a potential target system to which a product can be deployed and be subsequently configured. Each system has a set of environment profiles. Environment Profiles (EP) are ID referenced, but there are conditions where the data content of the EP is not ID Referenced or where the information required for constructing a meaningful error message cannot be determined from the ID reference alone.

If deleting an EP the following checks are performed:

Check all Symbol Table Symbol Entries (ST/SE) for a reference to the EP. The parent symbol table and symbol entry is stored if a reference exists. All occurrences in all ST/SE are reported.

Product variable groups are a nested collection of product variables. These may extend to many levels and as the descriptive names of variables and groups are not unique a full hierarchical path message are constructed in order to alert the user to the specific use of the EP. The full PVG/PV structure must be processed and any reference to the EP in a PV "default set-by" attribute is reported. The error may take the form of "Environment Profile: Apple is reference by a default set-by in Product Variable: AAA.BBB.CCC.DDD.Orange" (AAA, BBB, CCC, DDD are groups and Orange is the PV).

Resources and process can be repeatable. They are based on repeatable EPs. If a user is deleting an EP, the user must first check that this is not the last repeatable EP. If it is the last, then all resources and processes must be checked and if there are any which are repeatable, then an error message is generated for each occurrence of the referencing resource or process.

3. Specific Validation of Product Variables

Product variables are a collection of collections. Each collection is referred to as a Product Variable Group (PVG). The root level group is by default assigned to the FMID the SCS XML instance document defines. Each PVG can contain other PVGs. Each PVG contains one or more Product Variables (PVs). A PVG must contain at least one PVG or one PV. In the hierarchical structure of a PVG family: root→a(pvg)→b(pvg)→c(pvg), the lowest level PVG (c) must contain at least one PV. Higher level PVGs (root, a, b) need only contain at least one PVG.

If deleting a PV, then the following checks are performed:

Expressions are complex regular expressions which are used in MDB data objects. To check the configuration for references to the PV in an expression may be a time consuming affair. To perform this process efficiently, an SQL statement is run over the database for all references to the PV in a table for the current configuration. Any found occurrences are then found in the configuration to prepare a meaningful error message.

PVs can be referenced in symbol tables. Any references are reported to the user in an error message containing details of the referencing symbol table.

PVs can also be referenced by other PVs by use of an expression calculation or string expression. Given the hierarchical nature of PVs and PV Groups, the entire PVG→PV structure in a configuration is checked and the full path reported to the user as an error (as in the example above).

If creating or updating a PV, the following checks are performed:

PV names within the same PVG must be unique.

A PVG/PV hierarchy can extend to many levels (the number is not fixed). However, when marshalled to XML, each PVG is indented. A hard limit of 508 characters is set, as exceeding this limit will cause the configuration to fail when deployed to a mainframe. The length of the marshalled description tag must not exceed 508 characters when viewed in the context of a full configuration. This includes the white space indentation when the full configuration is marshalled. Formula for calculating length=(13 (initial indent for 1st PVG) OR 17 (if root variable)+ (no. of parent groups*4)+4 (indent to description tag)+24 (length of start tag)+Length of Description+ 25 (length of end tag). If the length exceeds this limit the user is informed. The threshold is dynamic depending on how far down the hierarchical tree the PVG/PV is.

The max length attribute must not exceed a value as set by the domain type.

Default value and default set-by are mutually exclusive attributes, only one can be selected.

Fixed value, hidden and user must verify are a grouping of data attributes. At least two of these must be selected.

A default set-by value to another PV must not create a circular reference.

A PVs default value must match with the max length field.

If permitted values are present, the default value should not be checked against the domain, it should only be checked against the permitted values (both ranges/strings and regular expressions).

If permitted values are not present, then the domain type must be checked.

DDNAME: product variables default value must match with the pattern alphabet (A-Z), national (# @ $) and second to eight character must match with the pattern alphabet (A-Z), national (# @ $), numeric (0-9).

DSNAME: The PV default value must conform to being a valid IBM MVS data set name. Specifically:

The max length of the PV default value cannot exceed the specified max length of the specified by the PV. Additionally, the max length of a DSNAME PV cannot exceed 44 characters, and therefore, if specified, its default value cannot exceed 44 characters.

DSNAME is made up of one or more nodes. Each node cannot exceed 8 characters. When a DSNAME contains two or more nodes, each node is separated by a period (.).

Each node making up a DSNAME PV default value must match with the pattern alphabet (A-Z), national (# @ $) and second to eighth character must match with the pattern alphabet (A-Z), national (# @ $), numeric (0-9), MEMBERNAME: A PV default value must conform to being a valid IBM MVS partitioned data set member name. Specifically:

A MEMBERNAME PV default value must match with the pattern alphabet (A-Z), national (# @ $) and second to eighth character must match with the pattern alphabet (A-Z), national (# @ $), numeric (0-9).

DSNAMEWITHMEMBERNAME: A PV default value must conform to being a valid IBM MVS partitioned data set name that also specifies a valid IBM member name. Specifically:

The MEMBERNAME is appended to the DSNAME where it is enclosed by a matched set of open and closing parenthesis. For example; MY.DATASET.NAME(MYMEMB).

The maximum length for the default value for a DSNAMEWITHMEMBERNAME PV cannot exceed 54 characters (44+8+2). Respectively (max for DSNAME)+(max for MEMBERNAME)+(2, one for each parenthesis).

JOBNAME: PV default value must match with the pattern alphabet (A-Z), national (# @ $) and second to eighth character must match with the pattern alphabet (A-Z), national (# @ $), numeric (0-9).

LOWERCASETEXT: PV default value must be lower case.

UPPERCASETEXT: PV default value must be upper case.

NUMERIC: PV default value must be numeric.

Embodiments of the present disclosure were described herein with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method of operating a computer system comprising:
receiving an instruction to delete a respective one metadata object of a plurality of metadata objects in a configuration object hierarchy for a computer program; and
logically validating the respective one metadata object according to specific validation rules that apply to deleting the respective one of the metadata objects, the logically validating the respective one of the metadata objects comprising:
logically validating the metadata objects in the metadata of the computer program according to a first technique, in response to the size of the metadata being greater than the threshold;
logically validating the metadata objects in the metadata of the computer program according to a second technique that is different from the first technique, in response to the size of the metadata being less than the threshold;
determining whether the respective one metadata object is referenced in another metadata object of the plurality of metadata objects in the configuration object hierarchy; and
in response to determining that the respective one metadata object is referenced in another metadata object in the configuration object hierarchy, preventing deletion of the respective one metadata object.

2. The method according to claim 1, further comprising:
receiving an instruction to change a respective one metadata object of a plurality of metadata objects in a configuration object hierarchy for a computer program; and
logically validating the respective one metadata object according to specific validation rules that apply to changing the respective one of the metadata objects.

3. The method of claim 2 wherein the logically validating the respective one of the metadata objects further comprises, in response to determining that the respective one of the metadata objects is referenced in another metadata object in the configuration object hierarchy, preventing the respective one of the metadata objects from being changed.

4. The method according to claim 1:
wherein the first technique comprises converting the metadata objects into a string.

5. The method according to claim 4 wherein the first technique further comprises:
creating a document comprising a plurality of nodes from the string;
retrieving from the document the nodes that comprise an ID reference; and
confirming that the nodes that comprise an ID reference have referential integrity.

6. The method according to claim 1:
wherein the second technique comprises recursively processing the metadata objects to confirm that the metadata objects have referential integrity.

7. The method according to claim 6 wherein recursively processing the metadata objects to confirm that the metadata objects have referential integrity comprises:
executing respective methods of a given object to retrieve respective child objects; and
retrieving a primary key of the respective child object and the given object to determine if the given object and the child object have the same primary keys.

8. The method according to claim 7 further comprising:
setting the respective child object as the given object and performing the executing and the retrieving if the primary keys are not the same; and
flagging a referential integrity error for the given object if the given object and the respective child object do not have a same parent object.

9. The method according to claim 7 wherein executing respective methods of the given object to retrieve respective child objects is performed using object reflection.

10. The method according to claim 1 wherein the logically validating comprises logically validating the metadata objects in the metadata for the computer program to confirm that a value of an attribute of a relation exists as a value of another attribute in a different relation or in the same relation.

11. A computer system comprising:
a processor; and
a metadata validating system that runs on the processor and is configured to perform operations comprising:
receiving an instruction to delete a respective one metadata object of a plurality of metadata objects in a configuration object hierarchy for a computer program; and
logically validating the respective one metadata object according to specific validation rules that apply to deleting the respective one of the metadata objects, the logically validating the respective one of the metadata objects comprising:
logically validating the metadata objects in the metadata of the computer program according to a first technique, in response to a size of the metadata being greater than a threshold;
logically validating the metadata objects in the metadata of the computer program according to a second technique that is different from the first technique, in response to the size of the metadata being less than the threshold;
determining whether the respective one metadata object is referenced in another metadata object of the plurality of metadata objects in the configuration object hierarchy; and
in response to determining that the respective one metadata object is referenced in another metadata object in the configuration object hierarchy, preventing deletion of the respective one metadata object.

12. The computer system according to claim 11, wherein the operations further comprise:
receiving an instruction to change a respective one metadata object of a plurality of metadata objects in a configuration object hierarchy for a computer program; and
logically validating the respective one metadata object according to specific validation rules that apply to changing the respective one of the metadata objects.

13. The computer system according to claim 11 wherein the first technique comprises:
converting the metadata objects into a string;
creating a document comprising a plurality of nodes from the string;
retrieving from the document the nodes that comprise an ID reference; and
confirming that the nodes that comprise an ID reference have referential integrity.

14. The computer system according to claim 11:
wherein the second technique comprises recursively processing the metadata objects to confirm that the metadata objects have referential integrity.

15. The computer system according to claim 14 wherein recursively processing the metadata objects to confirm that the metadata objects have referential integrity comprises:
   executing respective methods of a given object to retrieve respective child objects; and
   retrieving a primary key of the respective child object and the given object to determine if the given object and the child object have the same primary keys.

16. The computer system according to claim 15 further comprising:
   setting the respective child object as the given object and performing the executing and the retrieving if the primary keys are not the same; and
   flagging a referential integrity error for the given object if the given object and the respective child object do not have a same parent object.

17. A computer program comprising:
   a non-transitory computer readable storage medium comprising computer readable program code embodied in the medium that when executed by at least one processor of a computer system causes the computer system to perform operations comprising:
      receiving an instruction to delete a respective one metadata object of a plurality of metadata objects in a configuration object hierarchy for a computer program; and
      logically validating the respective one metadata object according to specific validation rules that apply to deleting the respective one of the metadata objects, the logically validating the respective one of the metadata objects comprising:
         logically validating the metadata objects in the metadata of the computer program according to a first technique, in response to a size of the metadata being greater than a threshold;
         logically validating the metadata objects in the metadata of the computer program according to a second technique that is different from the first technique, in response to the size of the metadata being less than the threshold;
            determining whether the respective one metadata object is referenced in another metadata object of the plurality of metadata objects in the configuration object hierarchy; and
            in response to determining that the respective one metadata object is referenced in another metadata object in the configuration object hierarchy, preventing deletion of the respective one metadata object.

18. A method of operating a computer system comprising:
   determining, for each metadata object of a plurality of metadata objects in a configuration object hierarchy for a computer program, a size of the metadata object;
   determining, for each metadata object, whether the size of the metadata object is greater a predetermined threshold;
   logically validating each metadata object according to a first technique, in response to a determination that the size of the metadata is greater than the predetermined threshold; and
   logically validating each metadata object according to a second technique that is different from the first technique, in response to a determination that the size of the metadata is not greater than the predetermined threshold.

* * * * *